(12) United States Patent
Caruana et al.

(10) Patent No.: US 8,154,388 B2
(45) Date of Patent: Apr. 10, 2012

(54) SYNCHRONOUS-PHASE CONTACTLESS DEMODULATION METHOD, AND ASSOCIATED DEMODULATOR AND READER

(75) Inventors: Jean-Paul Caruana, Marseilles (FR); Alain Guinet, Le Beausset (FR); Gregory Capomaggio, Marseilles (FR)

(73) Assignee: Gemalto SA, Meudon (FR)

( * ) Notice: Subject to any disclaimer, the term of this patent is extended or adjusted under 35 U.S.C. 154(b) by 549 days.

(21) Appl. No.: 11/137,355

(22) Filed: May 26, 2005

(65) Prior Publication Data

US 2005/0280510 A1 Dec. 22, 2005

(30) Foreign Application Priority Data

Jun. 16, 2004 (FR) ...................... 04 51284

(51) Int. Cl.
*H04Q 5/22* (2006.01)

(52) U.S. Cl. ...................... 340/10.4; 340/10.1

(58) Field of Classification Search ................ 340/10.4, 340/572.7, 825.54, 825, 10.1, 572.1, 10.2, 340/10.3, 10.31, 10.32, 10.33, 10.34, 10.41, 340/10.42, 10.5, 10.51, 10.52, 1.1, 572.2, 340/572.3; 343/867, 728, 729, 858; 333/131, 333/24; 178/45; 455/272, 274, 41.1, 41.2; 342/42; 235/492
See application file for complete search history.

(56) References Cited

U.S. PATENT DOCUMENTS

| 3,707,711 | A | * | 12/1972 | Cole et al. ................... 340/10.34 |
| 3,742,150 | A | * | 6/1973 | Sherman et al. ............. 455/41.1 |
| 3,810,147 | A | * | 5/1974 | Lichtblau ................... 340/572.3 |
| 5,418,353 | A | * | 5/1995 | Katayama et al. ............ 235/380 |
| 5,798,709 | A | * | 8/1998 | Flaxl .......................... 340/10.34 |
| 5,952,935 | A | * | 9/1999 | Mejia et al. .................. 340/10.3 |
| 6,028,503 | A | * | 2/2000 | Preishuberpflugl et al. . 340/10.4 |
| 6,650,226 | B1 | * | 11/2003 | Wuidart et al. .............. 340/10.1 |
| 6,747,548 | B1 | * | 6/2004 | Yamaguchi ................ 340/10.51 |
| 2001/0038333 | A1 | * | 11/2001 | Keskilammi et al. ...... 340/572.1 |
| 2003/0174099 | A1 | * | 9/2003 | Bauer et al. ................... 343/893 |

* cited by examiner

*Primary Examiner* — Nabil Syed

(74) *Attorney, Agent, or Firm* — Buchanan Ingersoll & Rooney PC

(57) ABSTRACT

A method of demodulating signals of an electromagnetic field induced by a contactless transponder includes a step in which the signals from the transponder are detected at given times or frequency. The times or frequency of the detection are synchronized in phase with the electromagnetic field. An associated demodulator and reader are also disclosed.

12 Claims, 4 Drawing Sheets

SYNCHRONOUS-PHASE CONTACTLESS DEMODULATION METHOD, AND ASSOCIATED DEMODULATOR AND READER

This disclosure is based upon French Application No. 0451284 filed Jun. 16, 2004, the contents of which are incorporated by reference.

BACKGROUND OF THE INVENTION

The invention concerns a demodulation method and system for a contactless transponder reader. More particularly, the invention concerns an improvement to communications between a reader and a transponder.

Transponder should be taken to mean, in the context of the following description, any identification apparatus able to be detected or to communicate by means of an electromagnetic field. The various appliances may for example be chip cards or electronic labels of the contactless type comprising a communication interface with an antenna. The present application concerns more particularly electromagnetic transponders comprising a coil connected to a capacitor or to an integrated circuit or to other electronic components.

Reader should be taken to mean, in the context of the following description, a transmitting/receiving device provided with an antenna which creates an electromagnetic field at a given frequency. The antenna of the device also makes it possible to modulate the electromagnetic field and to measure variations in the electromagnetic field. The reader antenna generally consists of one or more coils.

The reader-transponder system functions in a more or less complex manner according to the type of transponder used. The general operating principle consists of the emission of an electromagnetic field of a given frequency. When a transponder enters the electromagnetic field, it is then supplied and reacts. The reaction of the transponder causes a variation in the electromagnetic field which is detected by the reader.

For the more complex systems, the transponder comprises for example an integrated circuit connected to a coil, the coil and integrated circuit forming amongst other things a tuned resonant circuit. The presence of the transponder in the electromagnetic field supplies the integrated circuit, which modulates the electromagnetic field to indicate its presence to the reader. Then a dialogue can take place between the transponder and the reader by modulation of the electromagnetic field. These systems are known by the term contactless chip card or electronic labels and are used for many applications.

The reader (FIG. 1) generally consists of a fixed-frequency current or voltage generator and an antenna implemented for example by a circular flat coil comprising at least one turn. In the case concerned here (a product under the standard ISO/IEC 14443) this frequency is 13.56 MHz. It may be different according to the technical fields considered.

The reading antenna can be assimilated to a conductor, when this has a current running through it, a magnetic field is generated. The orientation of the magnetic field is defined by the direction of travel of the current. The current loop formed by the conductor once this current has passed through it has a North pole on one face and a South pole on the opposite face.

When a transponder is subjected to this reading field, because of its own coil, it can also be assimilated to a conductor moving in a magnetic field. When a conductor moves in a magnetic field, cutting the flux lines, an e.m.f. is induced in the conductor. In the same way an e.m.f. voltage is induced if the flux varies through a fixed circuit. In all cases, this induced e.m.f. voltage and the level of variation of the flux are linked by Faraday's law: $e=-d\phi/dt$.

FIG. 2 depicts a reading system generally used in the prior art. It consists of a generator 1 intended to produce a current at a given frequency, a connecting cable 2, an impedance matching circuit 3 and an antenna 4. The generator is characterised by the power that it is capable of supplying on an adapted impedance load. This impedance in general has a value of 50 ohms, it corresponds to the output impedance of the generator (1). The matching circuit (3) is necessary for transmitting in the antenna (4) the maximum power that the generator (1) can deliver.

The reader-transponder system functions in a more or less complex manner depending on the type of transponder used. When a transponder enters the electromagnetic field, it is then supplied and reacts. The reaction of the transponder causes a variation in the electromagnetic field that is detected by the reader. For more simple systems, the transponder for example consisting of a coil and a capacitor, the assembly forms a resonant circuit tuned to the frequency of the electromagnetic field. The presence of the transponder in the field makes the resonant circuit resonate and causes a modification to the field that can be detected by the reader. These systems, which are very simple, are commonly used as an anti-theft device in shops.

One major problem of transponder and reader systems is providing the transponder with the energy necessary for its functioning with maximum efficiency whilst reducing the radiation power of the reader without reducing the transmission distances between the antenna and the transponder.

For integrated-circuit transponders, the problem becomes very complex since the electromagnetic field serves on the one hand to supply the integrated circuit and on the other hand as a carrier frequency for establishing a mono- or bi-directional communication between the transponder and the reader. In fact the use of this magnetic field for these two uses becomes inconsistent.

In order to be able to make communications, it is necessary to modulate the electromagnetic field in frequency and/or amplitude. However, a person skilled in the art knows that, when the power of the electromagnetic field emitted by the antenna is too great, then the reader becomes less sensitive to the variations in amplitude of this field caused by the variation in load induced by the transponder. This is a problem of signal to noise ratio. It is also known by persons skilled in the art that the increase in the transmission power of the electromagnetic field creates heating in the integrated circuit which may give rise to its partial, temporary, total or definitive destruction.

It is also known that, when the transponder coil is tuned to the same frequency as the reader antenna (which is preferably the transmission frequency in order to have good emission efficiency), communication holes exist. This significant problem may arise throughout the normal operating distance rather than outside the limits provided for. This is because, according to the reading transponder coupling, the variations in load induced by the transponder on the magnetic field, seen through the reading antenna, may be equal, whether or not the transponder is acting on the electromagnetic field. The result is that the reader cannot decode the message. This reading problem is greater or lesser according to the choice of the demodulation method that it uses.

This is because this problem of "communication hole" is crucial and it is explained by a fine analysis of the system defined by the reader and transponder.

Looking again at the diagram in FIG. 2, it can be seen that the prior art consists of generating a sinusoidal signal with a fixed frequency (13.56 MHz for ISO/IEC 14443, which is injected after impedance matching into an antenna generally consisting of a conductor comprising one or more turns. As previously described, the current flowing through this conductor will produce a magnetic field H with the same frequency. This field, because of the inductive part of the reading antenna, will not be in phase with the current coming from the generator but rather in phase opposition.

In the absence of any coupling between the reading antenna and a transponder, the phase difference described above remains fixed.

However, as soon as a transponder enters the field H issuing from the reading antenna, coupling appears and the inductive characteristics of the reading antenna are modified thereby. The result of this is then a variation in the phase difference between the field H and the signal produced by the generator.

This phase difference is no longer constant. It depends on the coupling and therefore on the position of the transponder with respect to the antenna, and on the consumption of the latter, which varies according to the operations which it performs and the non-linear elements which make it up.

These variations in phase cause breaks in the reader/transponder communication. In the best of cases (demodulator with double synchronous detection), they will cause a weakening in the signal seen from the reader. In the worst case (single synchronous detection or direct demodulation), the signal issuing from the transponder will be invisible to the reader.

Several demodulation methods are used at the present time by readers for decoding the message returned by the transponder.

The most simple method is direct demodulation (FIG. 3) carried out using a simple non-linear component such as a diode (5) associated with a resistor 6 and a filtering capacitor (7); the most sophisticated uses double synchronous detection, referred to as I/Q, as depicted by FIG. 4.

In the case of direct demodulation (FIG. 3) the demodulator is sensitive to the variation in impedance of the load which is situated at its input (Ve). This impedance is represented by a complex number which comprises two parts: a real part and an imaginary part. This type of demodulator is sensitive to the variation in the modulus (in the length) of the vector represented by this complex number. This length varies with the rhythm of the message returned by the transponder. Two lengths Z1 and Z2 exist for a given coupling. The amplitude of the demodulated signal corresponds to the difference in length of these two vectors.

FIG. 5 however shows that two different vectors may have equal lengths. Each of the circles where the lengths of Z1 and Z2 are equal corresponds to a "communication hole". This is because, the two lengths being equal, the demodulator will see no difference between the two logic states taken by the transponder. The influence of the phase appears as one of the parameters of this malfunctioning.

The use of a direct-detection demodulator in the context of a contactless transponder reader may cause total breaks in communication according to the coupling between the reading antenna and the transponder.

In the case of the most sophisticated demodulator (double detection synchronous type I/Q) as described by FIG. 4, it has been found that the phase shift brought about by the transponder may cause an attenuation in the amplitude of the demodulated signal. This attenuation may attain a factor of 0.707 with respect to the maximum signal.

This maximum attenuation is reached when the phase of the field H is out of phase by n/4 with respect to the signalling issuing from the generator. A phase lock loop (PLL) is capable of restoring the frequency of the carrier with a constant amplitude, on the other hand there remains a phase difference "phi" between the carrier frequency and the restored frequency.

Thus a contactless transponder reader, even equipped with the most improved of the amplitude demodulation devices, because of the uncontrolled variations in the phase of the field H with respect to the signal produced by the reader, is liable to suffer breaks in communication due to an attenuation in the demodulated signal.

ISO/IEC 10373-6 defines the test methods applied to the readers and transponder in order to be in accordance with ISO/IEC 14443.

In order to be in conformity with the standard with regard to communication to the reader, a transponder must produce a retro-modulation signal whose side-band amplitude is at least $30/H^{1.2}$ (with H the amplitude of the magnetic field). As for the reader, in order to be in conformity with the standard, it must be capable of demodulating at least the signal of this amplitude, independently of the phase.

It is clear that the methods described previously are not capable of this. This is because a reader in conformity with ISO/IEC 14443, capable of detecting a message amplitude of $30/H^{1.2}$ may be incapable of detecting a transponder, it also however in conformity with ISO/IEC 14443, if the influence of the transponder causes an excessively great attenuation of the modulated signal having regard to the sensitivity of the reader, in particular when there is a phase difference of $\pi/4$ where the attenuation is maximum.

In consequence, the technical problems to be resolved can be defined as follows.

As on the one hand the reading sensitivity of contactless transponder readers is affected independently of the demodulation principle used, by the variations in phase between on the one hand: the current applied to the reader antenna and on the other hand that of the resulting field. And on the other hand this phase difference is also variable according to the distance between the transponder and the reader antenna. The result is a major problem: an attenuation or even complete cancelling of the amplitude of the demodulated signal which may give rise to breaks in communication between the reader and the transponder during movements of the latter.

SUMMARY OF THE INVENTION

The invention therefore aims to allow the demodulation of the signal issuing from a transponder independently of the variations in phase which the latter may cause on the fields generated by the reading device.

The principle of the method of the invention consists of slaving the detection of the transponder message to the phase of the magnetic field generated, or to a value representing the phase (voltage, current, etc).

The detector of the demodulator preferably uses, as a clock signal, a signal issuing from the magnetic field in order to synchronous the acquisition of the message. In this way, any variation in phase of the field caused by the transponder will be transferred to the demodulation device. In this method, it is no longer, as in the prior art, the clock signal of the generator which is used as a phase reference of the demodulator, but a signal of the same frequency issuing from the magnetic field H.

To this end, the object of the invention is first of all a method of demodulating signals in an electromagnetic field (H) induced by a contactless transponder comprising a step according to which the transponder signals are detected at given times or frequency. It is distinguished in that the times or frequency of the detection are synchronised in phase with the electromagnetic field.

According to other characteristics or variants of the method:
- in order to synchronise, the flux caused by the electromagnetic field (H) is picked up in an additional coil and the phase of the flux is used as a synchronisation element;
- in order to synchronise, the phase of the current generating the electromagnetic field is picked up and is used as a synchronisation element;
- the signals of the transponder are detected at a sampling frequency equal to and in phase with the frequency of the electromagnetic field (H);
- a synchronisation clock CLK is generated from the phase taken from the electromagnetic field or its generating current and this clock is used to time the signal detection time.

Another object of the invention is a contactless transponder reader comprising a main electromagnetic field transmission/reception antenna, an electromagnetic signal demodulator comprising means of sampling the electromagnetic signal at a sampling frequency.

The reader is distinguished in that it comprises synchronisation means able to time and synchronise in phase the said sampling frequency of the demodulator in the same way as the phase of the electromagnetic field.

According to other characteristics or embodiments:
- the synchronisation means comprise an additional antenna able to pick up part of the magnetic field (H) used by the transponder, and a sampling control circuit able to generate a control signal for the synchronous sampling of the electromagnetic field (H);
- the synchronisation means comprise an antenna sensitive to the electrical field (E);
- the synchronisation means comprise current diversion means able to take off part of the current flowing in the conductor forming the reading antenna and to extract therefrom phase information for synchronising the sampling;
- the additional antenna is detuned with respect to the main antenna;
- the demodulator is a synchronous detection demodulator.

Finally, an object of the invention is a demodulator for signals induced by a contactless transponder in an electromagnetic field (H), the said demodulator comprising a signal detector acting at given times, means of slaving the detection to the phase of the electromagnetic field; it is distinguished in that the slaving means continuously provide synchronisation with the phase.

BRIEF DESCRIPTION OF THE DRAWINGS

Other characteristics and advantages of the present invention will emerge from a reading of the following description of particular example embodiments, the said description being given with the accompanying drawings, in which.

DETAILED DESCRIPTION

Figure 6:
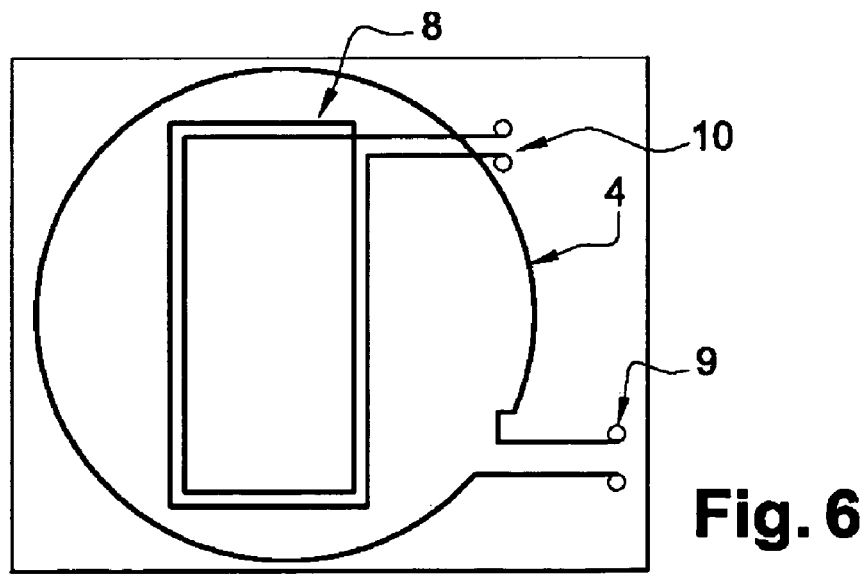
FIG. 6 illustrates an embodiment of the reading antenna according to the invention.

One of the embodiments of the invention is presented in FIG. 6. Advantageously the slaving can be carried out by means of an additional coil or antenna 8, comprising at least one turn, the value of which will have a negligible coupling effect on the antenna of the reader (1) compared with that of a transponder.

This coil is positioned so as to pick up part of the electromagnetic field used by the transponder. In particular, it may be attached to the reading antenna; preferably, it will be concentric with it. The connection pins 9 will be connected to the impedance matching circuit of the reading antenna, whilst the pins 10 will be used to return a synchronous signal from the field H to the reader.

The signal produced by this additional synchronous coil of the field H will be used to sample the transponder message in an analogue or digital fashion.

Figure 7:
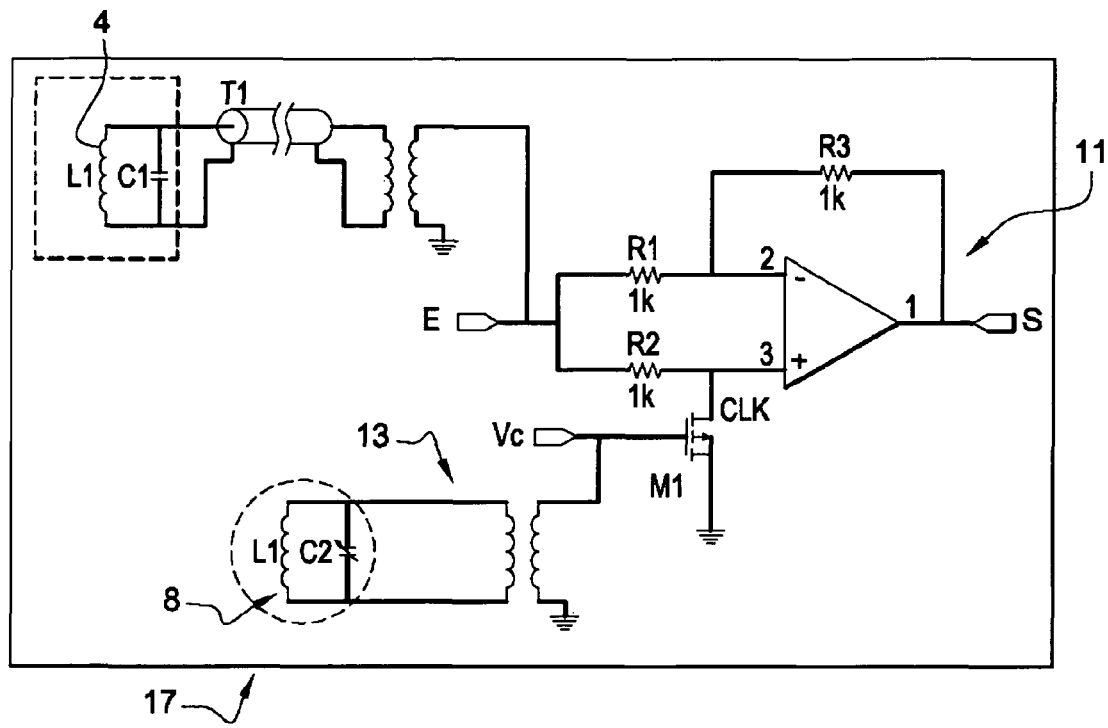
FIG. 7 illustrates a similar embodiment of the reader of the invention.
Figure 8:
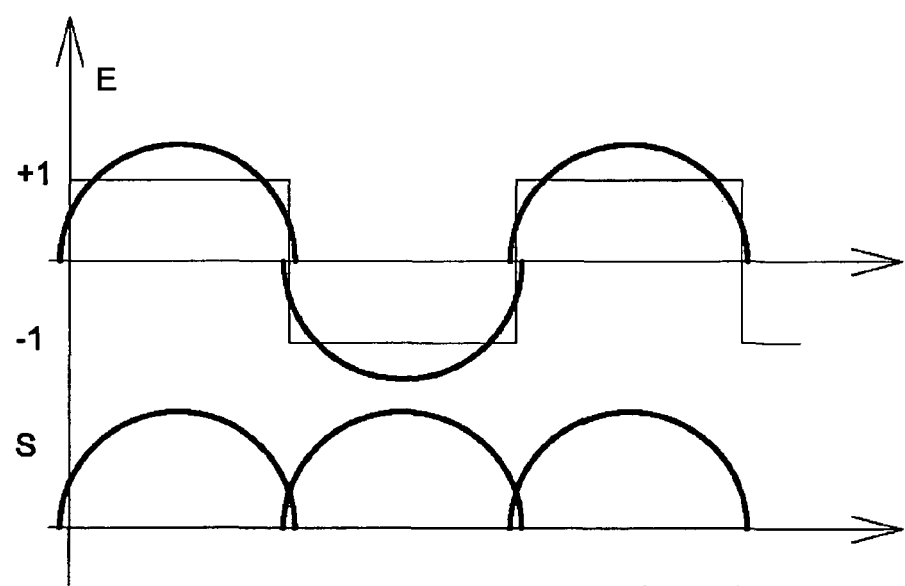
FIG. 8 illustrates a result of a processing operation relating to an implementation of the reader of FIG. 7.
Figure 9:
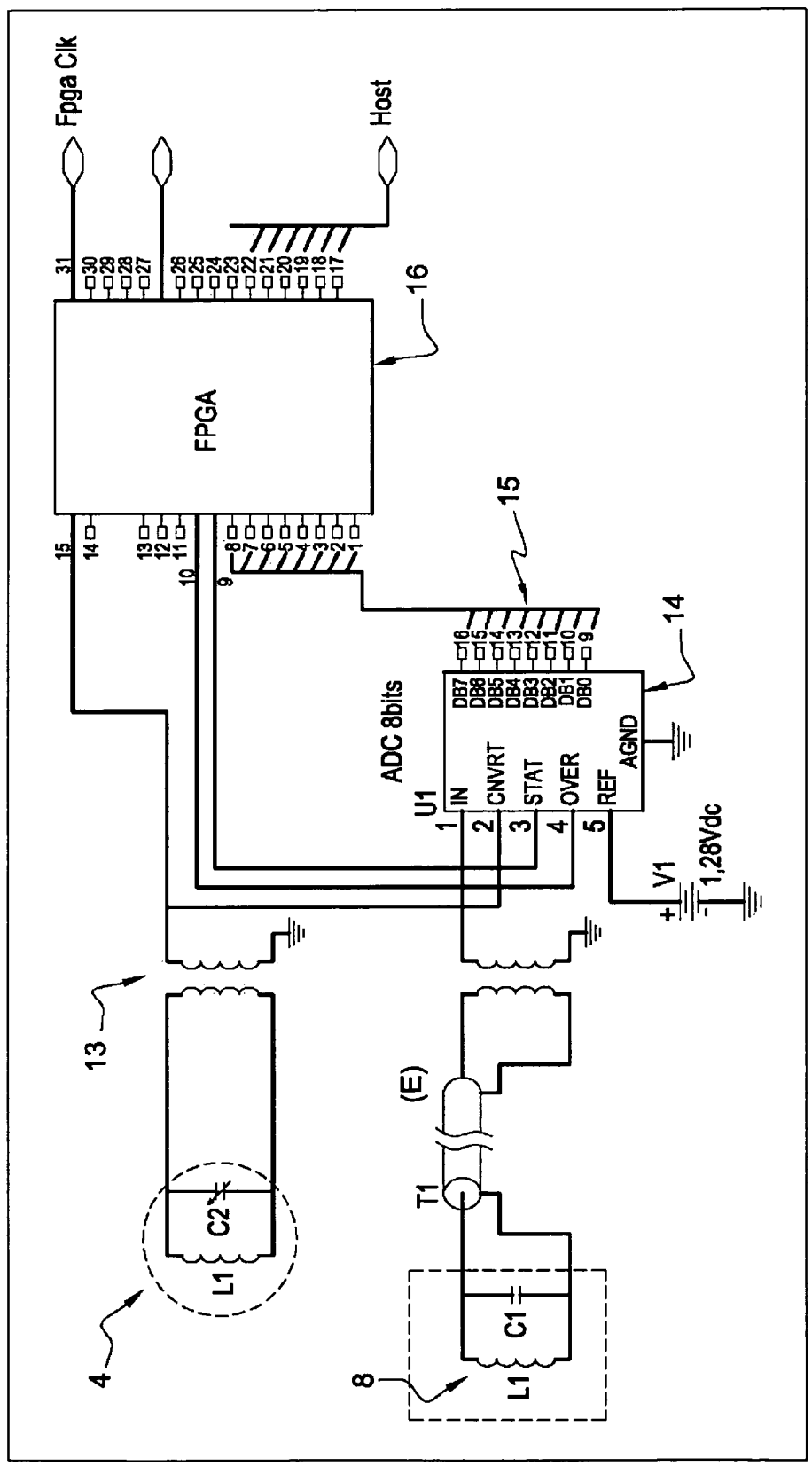
FIG. 9 illustrates a digital embodiment of the reader of the invention.

FIGS. 7 and 9 present respectively an analogue and digital embodiment of the reading device 17, 18 (antenna, reader). In the diagram in FIG. 7, the message E issuing from the reading antenna 4 is injected into an analogue multiplier 11, which will produce at its output a signal S, the signal issuing from the additional coil (8) after a level-matching stage 13 is processed by an adjustable passage de-phaser 12 (not shown) intended to compensate for the fixed part of the phase shift related to the acquisition chain. This signal is used to activate the chopping command (sampling) called Vc injected into a field effect transistor (FET) (M1). This command is such that:
if Vc>0=>S=+E
if Vc, 0=>S=−E This amounts to multiplying E by a square signal C of value=/−1 and $S(t)=E(t) \cdot C(t)$. The result of this operation is shown in FIG. 8.

This analogue multiplier function takes us back to the case of synchronous detection, Vc being produced by the additional coil 8, the detection is slaved in phase with the field H to which the transponder is subjected. The phase problems described in the present disclosure disappear. The acquisition made synchronous of the field is insensitive to the variations in phase caused by the transponder during its movements.

In FIG. 9, once again in this digital synchronous detection reader, the message E issuing from the reading antenna 4 is injected at the input of an analogue to digital converter 14 intended to sample the signal E. This converter will be chosen so as to have a sufficient dynamic range to acquire the message (12 bits). The signal issuing from the additional coil 8 after a level matching stage 13 is also processed by an adjustable passive phase shifter intended to compensate for the fixed part of the phase shift related to the acquisition chain. This signal is used to trigger the sampling of the analogue to digital converter 14 at the rate of the clock picked up from the field. The samples acquired by the converter at each triggering caused by the clock input are available in digital form on its output bus 15, in order to be processed by a processing means 16. This processing means may for example be a programmable coding/decoding unit (FPGA) or a microprocessor device.

Figure 3:
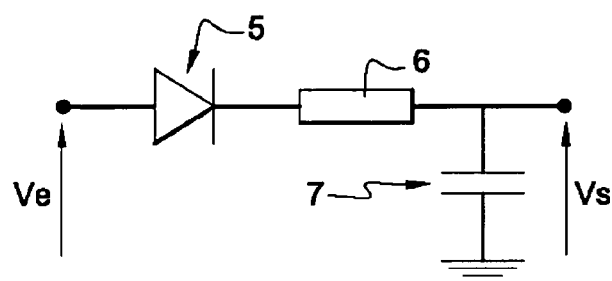
FIG. 3 (already described) illustrates an electronic diagram of a reader using direct demodulation of the prior art.
Figure 4:
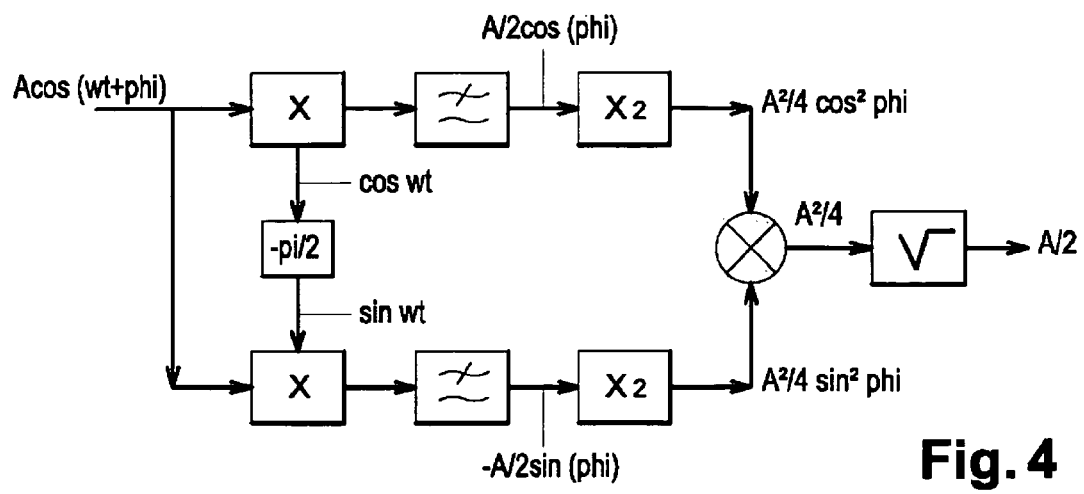
FIGS. 4 and 5 (already described) illustrate a diagram of the principle of the double synchronous detection demodulation I/Q of the prior art.
Figure 5:
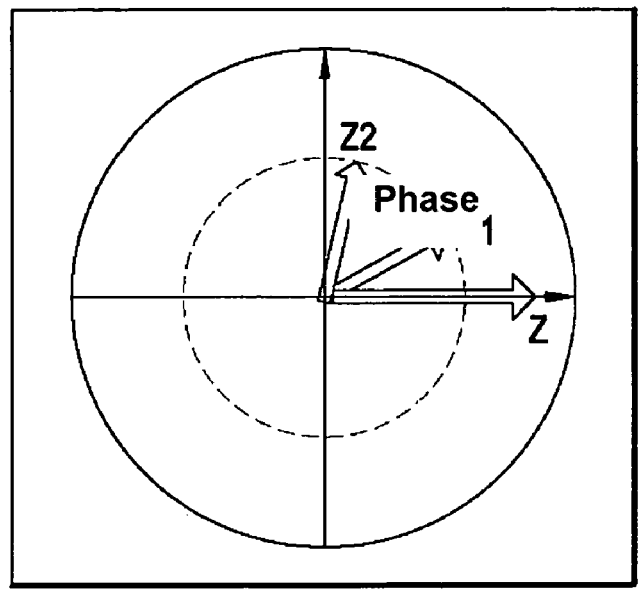

Having regard to the fact that the method according to the invention consists of slaving the demodulation by means of information coming from the magnetic field H produced by the reading antenna, other embodiments can advantageously be used. This is because the additional coil (FIG. 6-3) can be replaced by another device sensitive not to the magnetic field 8 but to the electrical field E. In this case, the flat coil representing a closed contour will have to be replaced with a dipole antenna sensitive to the electrical field. A matching amplification stage will then be necessary before returning the signal to the demodulation stage.

Figure 1:
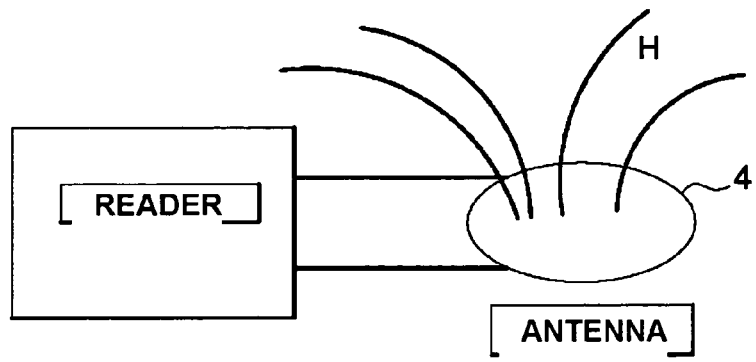
FIGS. 1 and 2 (already described) illustrate a contactless reader of the prior art.
Figure 2:
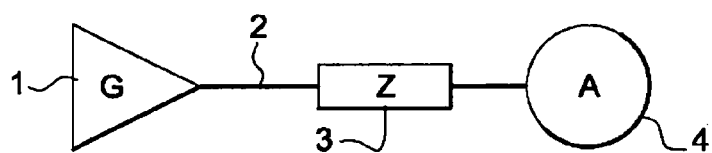

Another embodiment consists of taking off part of the current flowing in the conductor (FIG. 6-1) which forms the reading antenna, for example by means of a small load (a resistance of very low value: 0.2 ohms) and to return this phase information after matching to the demodulation stage. This is because the current flowing in the conductor is in phase with the magnetic field H since it is the source thereof.

The method of the invention can thus supplement those described in ISO/IEC 10373-6 relating to methods of testing contactless products in order to standardise a demodulated signal reference.

The invention claimed is:

1. A method of demodulating signals from an electromagnetic field induced by a contactless transponder in a system having a reader comprising a first antenna and a second antenna, the method comprising the steps of:
   detecting, by the first antenna in the reader, modulation of the electromagnetic field induced by the transponder;
   sensing, by the second antenna, a phase of the electromagnetic field;
   controlling the detection of the modulation in accordance with the sensed phase of the electromagnetic field.

2. A demodulation method according to claim 1, wherein in order to control the detection of the modulation in accordance with the sensed phase of the electromagnetic field, the flux caused by the electromagnetic field is sensed by the second antenna and the phase of the flux is used as a synchronisation element.

3. A demodulation method according to claim 1, wherein, in order to control the detection of the modulation in accordance with the sensed phase of the electromagnetic field, the phase of the current generating the electromagnetic field is sensed and is used as a synchronization element.

4. A demodulation method according to claim 2, wherein modulation of the electromagnetic field is detected at a sampling frequency equal to and in phase with the frequency of the electromagnetic field.

5. A demodulation method according to claim 2, wherein a synchronization clock is generated from the sensed phase of the electromagnetic field or its generating current and this clock is used to time the signal detection time.

6. A contactless transponder reader comprising:
   a main antenna for detecting modulation of an electromagnetic field;
   an electromagnetic signal demodulator comprising means of sampling the modulation of the electromagnetic field detected by the main antenna; and
   a synchronization means comprising a secondary antenna which is detuned with respect to the main antenna, wherein the synchronization means uses the secondary antenna to sense a phase of the electromagnetic field and controls the detection of the modulation in accordance with the sensed phase of the electromagnetic field.

7. A contactless transponder reader according to claim 6, wherein said secondary antenna is able to sense part of the magnetic field used by the transponder; and
   wherein the synchronization means further comprises a sampling control circuit, wherein the sampling control circuit is able to generate a signal controlling the sampling of the electromagnetic field.

8. A contactless transponder reader according to claim 6, wherein the synchronization means comprises an antenna sensitive to the electrical field.

9. A contactless transponder reader according to claim 6, wherein the synchronization means comprises a current diversion means able to sense the current flowing in the conductor forming the reading antenna and to extract therefrom phase information for synchronising the sampling.

10. A transponder reader according to claim 6, wherein the demodulator is a synchronous detection demodulator.

11. A transponder reader according to claim 6, wherein the synchronous detection is digital.

12. A demodulator for signals induced by a contactless transponder in an electromagnetic field, said demodulator comprising:
   a detector for detecting modulation of the electromagnetic field induced by the transponder that are received via a primary antenna of a reader,
   means of controlling the detection of the modulation in accordance with a phase of the electromagnetic field sensed by a secondary antenna of the reader, wherein the controlling means continuously provides synchronization of the detection of the modulation with the phase of the electromagnetic field sensed by the secondary antenna.

* * * * *